Dec. 18, 1956     F. T. MOSER     2,774,314
VARIEGATORS
Filed May 26, 1954
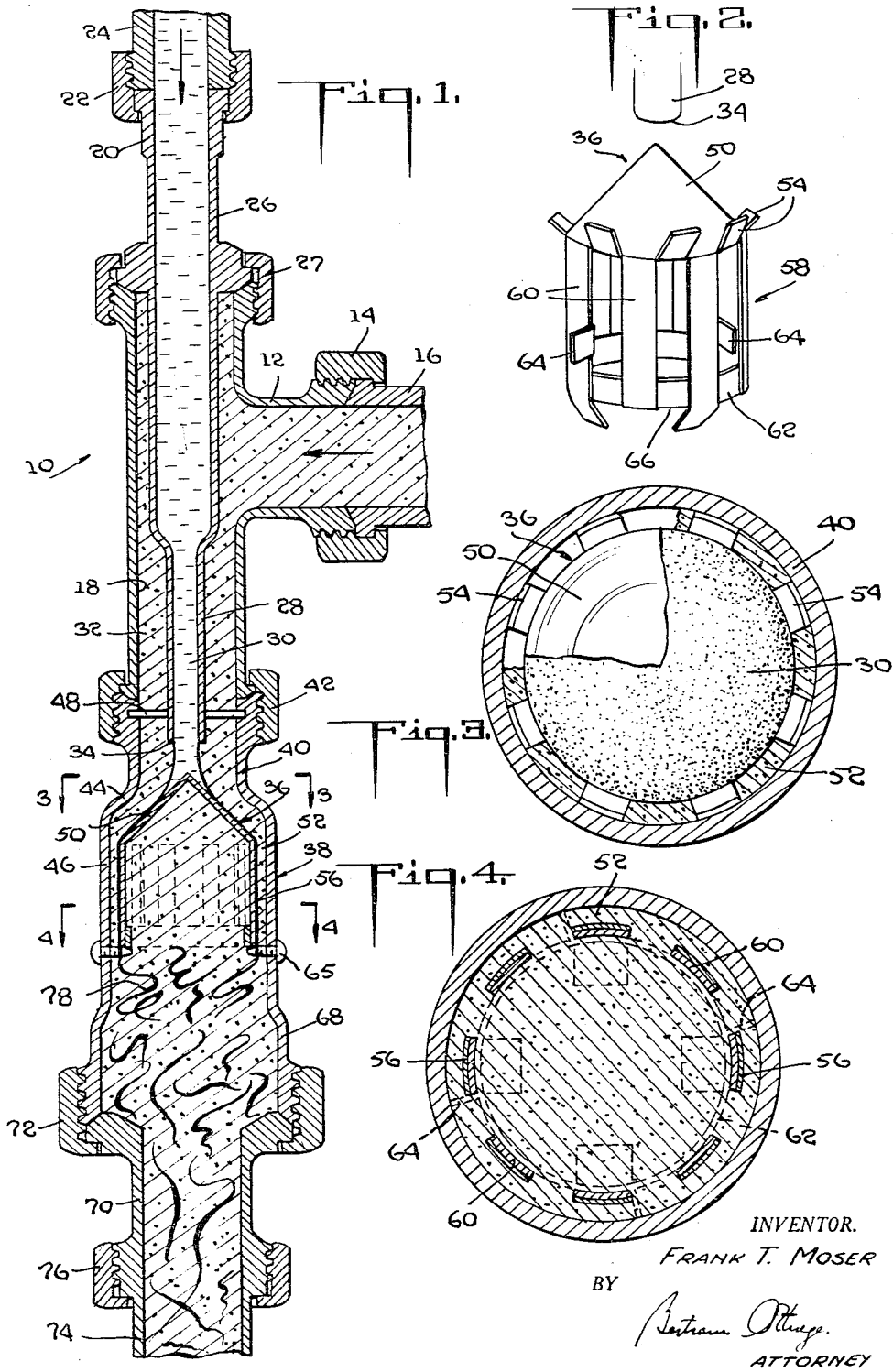
INVENTOR.
FRANK T. MOSER
BY
*Bertram Ottinger*
ATTORNEY

United States Patent Office 2,774,314
Patented Dec. 18, 1956

2,774,314

VARIEGATORS

Frank T. Moser, Easton, Pa., assignor to American Food Laboratories, Inc., Brooklyn, N. Y., a corporation of New York Application May 26, 1954, Serial No. 432,383

16 Claims. (Cl. 107—1)

This invention relates to a variegator and to a method of variegating an edible flowable inlay substance in an edible flowable matrix substance which is pasty, i. e. semi-stiff, at the time of variegation, a typical product being variegated ice cream.

At the present time the most common variegated substances, variegated frozen comestibles, are prepared commercially by introducing one or more pockets of a chilled sauce, topping, syrup or the like (hereinafter referred to for convenience simply as a "sauce") into a mass of a pasty, partially congealed, i. e. semi-stiff, comestible material, such as sherbet, ice, ice cream mix or the like (hereinafter referred to for convenience simply as an "ice cream mix"). The mass is of comparatively small size, not exceeding five gallons, so that it can be manipulated by hand. After introduction of the sauce the mass is gently rotated by hand and the resulting flow of the sauce and mass under the influence of gravitational and centrifugal forces causes the sauce to be distributed through the mass as irregular streaks or veins without, however, blending the sauce into the partially congealed comestible matrix. Thus the desired variegated effect is created.

This process has two serious disadvantages. Firstly, it is discontinuous, that is to say, it must be practiced upon batches and the batches are relatively tiny. Secondly, the process is essentially manual and therefore necessitates the use of considerable labor, resulting in a comparatively high cost for variegated frozen comestibles. Another disadvantage not heretofore realized was that the variegating effect was limited to the provision of sauce streaks in a matrix of a partially congealed semi-frozen substance.

It has been proposed to variegate frozen comestibles mechanically, for instance, by churning the partially congealed matrix with an agitator after sauce streams were introduced. It also has been proposed to interpose obstructing means in the path of a flowing matrix containing sauce streams so as to create turbulence which distributed the sauce. However, the severe working caused by beating or agitating the matrix disturbs the delicate crystalline structure of the partially congealed semi-frozen matrix, causing the finished hard frozen comestible to be gritty.

It is an object of my invention to provide a method and means for continuously variegating comestibles which are subject to none of the foregoing disadvantages.

It is another object of my invention to provide an apparatus for variegating frozen comestibles without agitating the matrix sufficiently to disturb the crystalline structure of the semi-frozen matrix material.

It is another object of my invention to provide a variegator which achieves the desired design in the comestible without the use of any moving parts whatsoever.

It is another object of my invention to provide a variegator which constitutes relatively few and simple parts, is rugged and durable in construction and, withal, highly efficient and economical in operation.

It is another object of my invention to provide a variegator which does not noticeably change any of the desired characteristics of the frozen comestible.

It is another object of my invention to provide a variegator which will effectively distribute the sauces including solid particles, such, for example, as fruits and nuts.

It is another object of my invention to provide a variegator which can efficiently handle sauces of various viscosity like chocolate, fudge, marshmallow or even butter-scotch.

It is another object of my invention to provide a variegator which can utilize even a partially congealed semi-frozen substance as the variegating material.

It is another object of my invention to provide a method for variegating frozen comestibles which will produce a product in every way as desirable as the present day hand-manufactured product.

Other objects of my invention in part will be obvious and in part will be pointed out hereinafter.

My invention accordingly consists in the features of construction, combinations of elements, arrangement of parts and series of steps which will be exemplified in the apparatus and process hereinafter described and of which the scope of application will be indicated in the appended claims.

In the accompanying drawings in which is shown one of the various possible embodiments of my invention, Fig. 1 is a vertical sectional view through a variegator constructed and operated in accordance with my invention;

Fig. 2 is a perspective view of a distributor employed in said variegator; and

Figs. 3 and 4 are enlarged sectional views taken substantially along the lines of 3—3 and 4—4, respectively, of Fig. 1.

In general, I achieve the several objects of my invention by providing a method and means pursuant to which one or more streams of one or more chilled semi-fluid variegating materials are introduced into a larger stream of a partially congealed semi-frozen comestible matrix material after which the speeds of said streams are reduced without introducing obstructions and preferably only by enlargement of the common passageway through which they flow so as to create a mild mingling action that causes the variegating streams to be randomly distributed throughout the body of the matrix stream and thereby bring about the desired variegated effect. The reduction in the speeds of the streams caused by enlargement of the passageway makes the variegating streams pile up, an effect somewhat like that secured by feeding a limp filament onto a surface, with the difference that the covolutions of the streams will not contact one another and indeed adjacent portions of the streams will separate as the mass experiences a gentle random movement at the region of enlargement.

The variegated semi-frozen mass then is frozen hard to retain the variegated appearance, this being conventional in the art.

Referring now in detail to the drawings, the reference numeral 10 denotes a variegator embodying my present invention. Said variegator includes an inlet 12 which is connected by a joint such as a union 14 to a pipe 16 that runs to a source, such as a continuous freezer (not shown), of a partially congealed chilled, semi-fluid comestible matrix substance, e. g. an ice cream mix, a sherbert mix or an ice mix that has been partly frozen to a state where it is pasty or semi-solid. In this condition the partially congealed substance is not too stiff to flow and can be caused to pass under pressure through pipes or orifices or the like. Optionally the source of the matrix substance is under a controllable pressure so that it will flow through the pipes 16 and inlet 12 and thence through the variegator at a regulatable speed.

The inlet 12 leads to a chamber 18 in the form of a straight elongated passageway of uniform diameter.

The variegator also includes a second inlet 20, this being the inlet into which there is introduced the comestible that it is desired to distribute in a variegated manner throughout the matrix material. The inlet 20 is connected as by a union 22 to a pipe 24 that runs to a source (not shown) of variegating material, which also is chilled and may be pasty, i. e., semi-fluid. This latter source is under pressure in order to permit variation in the rate of flow of the variegating material. The variegating material may be any flavor of sauce, topping or syrup, or even a partially congealed semi-frozen ice cream mix, sherbet mix or ice mix, the material optionally including solid particles.

I have spoken of both the matrix and variegating material as being chilled. The proper temperatures at which to variegate these materials is well known in the art. I may mention by way of example that satisfactory results are obtained where an ice cream mix is employed at a temperature of about 20–24° F. and a chocolate sauce at a temperature of about 35–40° F.

The inlet 20 is connected to a passageway 26 which runs into the blind, i. e., closed, end of the chamber 18. The connection between the passageway and chamber is suitably effected, as by a union 27. Said passageway 26 extends into the chamber 18 past the inlet 12, terminating beyond said inlet in a variegating feed section 28 of reduced diameter.

It will be appreciated that at this point in the variegator, i. e. at the variegating feed section, I have provided, according to the construction thus far described, a central stream 30 of a semi-fluid variegating material surrounded by an annular stream 32 of the partially congealed semi-fluid matrix material. At the exit end 34 of the feed section 28 the two streams are in direct contact with one another and flow together but due to their chilled condition and the pasty state of at least the matrix stream they will not blend with one another nor will they noticeably intermix. If at this point the rates of flow of the two streams are materially lowered I will obtain a variegated effect. However, at such point the variegating stream 30 is of substantial cross-section and is only a single stream so that the distribution will not be as widespread as is usually desired and the variegating streaks will be thicker and larger than now are conventional. Hence, before reducing the rates of flow I provide in the variegator suitable means for causing the single variegating stream 30 to be broken up into a plurality of smaller streams. Said means includes a distributor 36 and a distributor chamber 38.

The distributor chamber has an inlet 40 whose internal diameter matches the internal diameter of the outlet end 42 of the matrix chamber 18. The two chambers 18, 38 are suitably interconnected, as by a union 42. A short distance below the inlet 40 the distributor chamber 38 has a flared section 44 that leads to a portion 46 of uniform diameter which is substantially larger than that of the inlet 40.

It may be mentioned that the feed section 28 of the passageway 26 for the variegating material may be steadied as by radial pins 48 carried by the distributor inlet 40 and resting lightly against the external surface of the exit end 34 of said feed section.

The distributor 36 includes a leading section 50 of flaring shape the apex of which faces the exit end 34 of the variegating passageway and is coaxial therewith, i. e., is centered on the axis of said passageway. Desirably, the leading section is of conical contour and is symmetrical with respect to the axis of the exit end of the variegating pipe so that when the variegating stream 30 impinges on the apex of the leading section it will be uniformly distributed, i. e., spread, over the entire surface thereof.

The base of the leading section is of smaller diameter than the internal diameter of the enlarged portion 46 of the distributor and is concentrically located within the same whereby to define a narrow annular passageway 52.

A plurality of dividers 54 in the form, for instance, of tangs integral with the leading section extend radially away from the base of said section. These dividers break up the uniform flow of the variegating material over the leading section and confine, i. e., branch, it to a plurality of discrete streams 56. For uniformity in the finished product the dividers are equiangularly spaced around the base of the leading section, each stream being defined by the gap between a pair of adjacent dividers.

The variegating streams 56 descend through the enlarged portion 46 of the distributor chamber in a direction parallel to the direction of flow of the main variegating stream 30, this direction being controlled by a cage 58 which includes several parallel slats 60 mutually defining a cylindrical shape whose upper end is connected, as by welding, to the base of the leading section 50. The lower ends of the slats are connected, as by welding, to an internal supporting ring 62. Some of the slats, for instance, every other one, carry a radially extending finger 64.

The distributor is held axially centered in the distributor chamber 38 by engagement of the tips of the dividers 54 and the tips of the fingers 64 with the inner wall of said chamber. The location of the distributor lengthwise of the distributor chamber is effected by means of a set of screws 65 which engage tapped apertures in the distributor chamber and whose tips extend far enough into the chamber to provide a seat upon which the distributor 36 rests.

Immediately below the distributor the distributor chamber is clear, being filled in operation with the partly congealed semi-fluid matrix substance and the variegating material. A short distance below the trailing edge 66 of the distributor the distributor chamber is once again enlarged to form a second portion 68 whose function soon will be described. The lower end of the second enlarged portion is connected to an outlet 70 whose diameter is substantially equal to that of the matrix chamber 18 although this is not essential. Nevertheless, it is preferred to have the outlet 70 substantially smaller in diameter than the second enlarged portion 68. The outlet 70 is suitably connected to the second enlarged portion, as by a union 72, and is itself connected to a discharge passageway 74, as by a union 76.

In operation of the variegator the partly congealed semi-fluid comestible matrix substance entering into pipe 16 and inlet 12 flows down through matrix chamber 18 as an annular stream 32 until it comes into contact with the central stream of chilled variegating material 30. These two concentric streams then enter the distributor chamber 38 where the variegating stream flares outwardly over the leading section 50 of the distributor. At the same time the annular stream 32 of matrix material itself flares outwardly in the section 44, its flare matching the flare of the variegating stream. When the conical variegating stream strikes the dividers it is broken up into several smaller streams 56 which descend down the sides of the cage 58. Concurrently the matrix material flows through the annular passageway 52, as well as in the space between variegating streams 56, down the sides of the cage along with said variegating streams 56. It may be mentioned that during operation the hollow space inside the cage fills up with the matrix material which remains there for the length of a run.

From the point where the two streams 30, 32 meet, i. e., from the exit end 34 of the variegating feed section 28 to the trailing edge 66 of the distributor, the passageway through which the matrix material and the variegating material flow do not appreciably increase in cross-section so that throughout this portion of the variegator where the two streams are in contact and where the main variegating stream is broken up into smaller variegating ribbons, there is no tendency for the variegating streams or ribbons to deviate from the straight paths of travel which have been set for them. It is to be noted however that if desired the cross-section may be reduced during splitting of the variegator stream so that the matrix and variegating material are speeded up and subjected to some compaction.

It may be mentioned that I can, if I so desire, introduce the variegating material in the form of several small streams by a plurality of tubes having discharge ends at the base of the distributor. Also it will be appreciated that in this manner more than one variegating material can be simultaneously introduced. Moreover, the stream of matrix material can constitute side-by-side streams of different matrix substances.

As the matrix stream and variegating ribbons leave the distributor, the passageway which they now encounter has a cross-section appreciably greater than the cross-section of the annular passageway 52 through which these substances flow down alongside the distributor cage 58. Hence, as the substances leave the distributor cage their speeds of flow are abruptly reduced, a typical reduction being to one-third of their original speed, creating the dual effects of mild mingling and piling up of the stream and ribbons. The resulting convolutions 78 of the variegating ribbons are subjected to random slight pressures which thin and thicken the ribbons irregularly and cause adjacent portions thereof to break away from one another, thus creating veins which bring about the desired variegated effect without subjecting the mass to turbulence that would disturb the fine crystalline structure of the matrix.

At this point the combined substances are ready to be lead to packaging machines and chilling chambers.

I have found that the appearance of the product is somewhat improved by flowing the already variegated combined substances into the further enlarged portion 68 where a slight additional mingling and further variegating effect will be secured.

When the combined substances flow into outlet 70 there is a slight tendency to reduce the variegated effect but since the variegated veins already are so widely distributed throughout the matrix, the effect is not observable.

It is of the utmost importance to observe that the mixing and mingling action to which the variegating material and matrix are subjected is a mild and gentle one and it has been found that it will not disturb the fine crystal construction and stabilization of the matrix so that the quality thereof is not deteriorated.

In the event the matrix comprises plural materials flowing side-by-side these materials are intermixed, but not blended, as they leave the distributor creating, if the materials are differently colored, a unique rainbow effect that is desirable even if the variegated material is omitted.

It should be specifically mentioned that I can with my new variegator variegate such materials as ice cream in ice cream, sherbet in ice cream, ice cream in sherbet, etc.

It thus will be seen that I have provided a variegator and process which achieve the several objects of my invention and are well adapted to meet the conditions of practical use.

As various possible embodiments might be made of the above invention and as various changes might be made in the embodiment above set forth, it is to be understood that all matter herein described or shown in the accompanying drawings, is to be interpreted as illustrative and not in a limiting sense.

Having thus described my invention, I claim as new and desire to secure by Letters Patent:

1. In combination, means providing a passageway for an edible flowable pasty matrix material, means for introducing at least one stream of an edible flowable variegating material into the matrix material flowing through said passageway, and stationary branching means located in the path of travel of said stream of variegating material for dividing said stream of variegating material into continuously flowing outwardly displaced smaller streams.

2. A combination as set forth in claim 1 wherein the distributor includes a flaring member having elements extending outwardly from the periphery thereof.

3. A combination as set forth in claim 2 wherein the center of the flaring member is substantially in line with the first-named variegating stream.

4. A variegator comprising means providing a passageway for an edible flowable pasty matrix material, means for introducing at least one stream of an edible flowable variegating material into the matrix material flowing through said passageway, and stationary branching means located in the path of travel of said stream of variegating material for dividing said stream of variegating material into continuously flowing outwardly displaced smaller streams, said stream of matrix material and said smaller streams of variegating material leaving said passageway through the discharge end thereof, and a second passageway continuous with the discharge end of the first passageway and into which the first passageway discharges without obstruction, said second passageway having a cross-sectional area substantially greater than the cross-sectional area of the discharge end of the first passageway, so that the stream of matrix material and streams of variegating material are slowed down and thereby gently commingled.

5. A method of dispersing veins of a variegating material throughout a matrix, said method including the steps of introducing a stream of an edible flowable variegating material into a stream of an edible flowable pasty matrix material, which said streams have a joint predetermined cross-sectional area, and then slowing said streams down by increasing their joint cross-sectional area to gently commingle the same.

6. A method of dispersing veins of a variegating material throughout a matrix, said method including the steps of introducnig a stream of an edible flowable variegating material into a stream of an edible flowable pasty matrix material, breaking up the stream of variegating material into a plurality of smaller streams, said stream of matrix material and said smaller streams of variegating material having a joint predetermined cross-sectional area and then slowing down the matrix material stream and smaller variegating material streams by increasing their joint cross-sectional area to gently commingle the same.

7. A variegator comprising a passageway having a discharge end, means inducing a flow of an edible flowable pasty matrix material through said passageway, means inducing a flow of a stream of an edible flowable variegating material within said matrix material flowing through said passageway, and a second passageway continuous with the discharge end of the first passageway and into which the first passageway discharges without obstruction, said second passageway having a cross-sectional area substantially greater than the cross-sectional area of the discharge end of the first passageway so that the matrix material and stream of variegating material are slowed down and thereby gently commingle.

8. A variegator as set forth in claim 7 wherein there are a plurality of streams of variegating material.

9. A variegator as set forth in claim 7 wherein the cross-sectional area of the second passageway is at least three times the cross-sectional area of the discharge end of the first passageway.

10. A variegator comprising means providing a passageway, means inducing a flow of an edible flowable pasty matrix material through said passageway, means inducing a flow of a stream of an edible flowable variegating material within said matrix material flowing through said passageway, and a central stationary distributor of substantial cross-section in said passageway, said matrix material and said variegating material being deflected outwardly within said passageway by said distributor, the cross-sectional area of said passageway downstream of the distributor being substantially greater than the cross-sectional area of the passageway around the distributor so that the matrix material and stream of variegating material are slowed down and thereby gently commingle.

11. A variegator as set forth in claim 10 wherein the distributor divides the stream of variegating material into a plurality of smaller streams.

12. A variegator as set forth in claim 11 wherein the cross-sectional area of the passageway downstream of the distributor is at least three times the cross-sectional area of the passageway around the distributor.

13. A variegator as set forth in claim 10 wherein the distribuotr includes a flaring member having elements extending outwardly therefrom to divide the stream of variegating material into a plurality of smaller streams.

14. A variegator as set forth in claim 13 wherein the center of the flaring member is substantially in line with the first-named variegating stream.

15. A variegator as set forth in claim 10 wherein the passageway is enlarged downstream of the distributor and spaced therefrom.

16. A variegator comprising a passageway, means inducing a flow of an edible flowable pasty matrix material through said passageway, a stationary central obstruction of substantial size in the passageway in the flow path of the matrix material, means inducing a flow of a stream of an edible flowable variegating material onto said stationary obstruction and over the edge thereof, said obstruction including means to divide said stream into plural small streams as it flows past said obstruction, the cross-sectional area of the passsageway downstream of the obstruction being substantially greater than the cross-sectional area of the passageway around the obstruction so that the matrix material and smaller streams of variegating material are slowed down and thereby gently commingle.

References Cited in the file of this patent
UNITED STATES PATENTS

| | | |
|---|---|---|
| 1,083,275 | Eberhard | Jan. 6, 1914 |
| 2,190,226 | Alexander | Feb. 13, 1940 |
| 2,646,757 | Hackmann | July 28, 1953 |
| 2,669,946 | Peyton | Feb. 23, 1954 |
| 2,680,414 | Balch | June 8, 1954 |